United States Patent [19]

Peeters

[11] Patent Number: 4,827,469
[45] Date of Patent: May 2, 1989

[54] OPTICALLY READABLE INFORMATION DISK

[75] Inventor: Hendrikus W. C. M. Peeters, Hapert, Netherlands

[73] Assignee: Optical Storage International-Holland, Eindhoven, Netherlands

[21] Appl. No.: 57,885

[22] Filed: Jun. 1, 1987

Related U.S. Application Data

[62] Division of Ser. No. 778,659, Sep. 23, 1985, Pat. No. 4,670,077.

[30] Foreign Application Priority Data

Apr. 19, 1985 [NL] Netherlands ............... 8501148

[51] Int. Cl.⁴ .............................................. G11B 7/26
[52] U.S. Cl. ........................................ 369/282; 369/270; 369/282; 425/810
[58] Field of Search ............... 369/280, 282, 290, 270, 369/271; 425/810

[56] References Cited

U.S. PATENT DOCUMENTS

| | | | |
|---|---|---|---|
| 3,035,840 | 5/1962 | Scott | 369/290 |
| 4,074,282 | 2/1978 | Balas et al. | 369/275 |
| 4,224,648 | 9/1980 | Roling | 360/135 |
| 4,312,823 | 1/1982 | Kraakman | 425/810 |
| 4,363,116 | 12/1982 | Klewters et al. | 369/275 |
| 4,470,137 | 9/1984 | Tago | 369/290 |
| 4,634,617 | 1/1987 | Ohta et al. | 369/282 |
| 4,672,395 | 6/1987 | Ata et al. | 369/284 |

Primary Examiner—Steven L. Stephan
Attorney, Agent, or Firm—F. Brice Faller

[57] ABSTRACT

Method of providing a substrate of an optically readable information disc with an optically detectable structure, mould for use in the method, apparatus for carrying out the method, and information disc manufactured in accordance with the method.

Substrate (3) is provided with a disc hub (8) comprising disc-centering means (9) which serve to center the finished information disc (17) on the drive spindle (27) of a drive apparatus. The intermediate product comprising the substrate (3) and the disc hub (8) is centered on the base (1A) of the mould by cooperation between the base-centering means (17) and the disc-centering means (9). This may be effected by the use of an auxiliary centering means (12) which is in contact with a wall (14) of a central centering hole (11) in the disc hub (8) and with a wall (13) of a central centering recess (10) in the base (1A). Thus, the reproduction layer is cured in the position which is thus centered without any play, after which the substrate together with the disc hub is detached from the mould without the centering of the servo track on the substrate being disturbed.

15 Claims, 2 Drawing Sheets

OPTICALLY READABLE INFORMATION DISK

This is a division of application Ser. No. 778,659, filed Sept. 23, 1985, Pat. No. 4,670,077.

BACKGROUND OF THE INVENTION

The invention relates to a substrate of an optically readable information disc provided with an optically detectable structure, which disc can be rotated by means of a drive apparatus comprising a drive spindle and optical read means. The disc is manufactured using a mould having a base provided with a mould structure which is covered with a reproduction layer, which in a deformable phase adapts itself to the mould structure, is subsequently solidified and, while attached to the substrate, is separated from the mould in such way that the structure is maintained.

U.S. Pat. No. 4,312,823 the manufacture of a video long-play disc by means of a reproduction layer made of a moulding resin. The substrate is transparent and is made of a suitable synthetic material. The moulding resin may be a radiation-curable moulding resin, which is exposed through the transparent substrate. The method described therein may also be employed for the manufacture of information discs for computer memories and similar uses, on which information can be recorded by means of a suitable light surce, such as a laser.

U.S. Pat. No. 4,363,116 described providing an information disc with an optically detectable servo track which extends over the entire area of that part of the information disc which is available for recording. The servo track is generally a spiral track, but in principle it may alternatively comprise a multitude of concentric sub-tracks. By means of a servo track it is possible to control the radial position of the radiation spot formed on the information layer by the radiation beam. The servo track may already contain information before the user records information on the information disc. This pre-recorded information in the servo track may comprise, for example, sector addresses in each of which the address of the associated continuous portion of the servo track is encoded in address areas. The servo-track contains a multitude of sector addresses per turn of the servo track. In addition to the track number or the number of the turn of the spiral servo track, the sector addresses may, for example, also contain the number of the relevant sector in this track or in this turn. In addition, a plurality of synchronizing areas may be present at the beginning of each sector address, which when read yield a clock regeneration signal which dictates the clock frequency of the electronic clock which determines the frequency with which the information to be recorded is supplied. The layer on which recording is possible by optical means is deposited on the transparent layer provided with the servo track and may be a thin metal layer, for example one containing tellurium.

Generally, optically readable information discs should comply with very stringent requirements as regards the eccentricity of the structure, for example the servo track, relative to the axis of rotation of the information disc. In a known information disc on which recording can be made by optical means, the information disc comprises two glass substrates which are hermetically affixed to each other by means of interposed annular spacers, as in U.S. Pat. No. 4,074,282. Such a disc, which has a diameter of approximately 30 cm, contains 32,000 spiral grooves with a pitch of 1.6 micron. The eccentricity of the servo track relative to the axis of rotation of the information disc should not exceed 20 microns. It will be evident that when the servo track and the sector addresses are formed on the substrate the method of forming the structure on the substrate should comply with very stringent requirements in view of the extremely small permissible eccentricity.

SUMMARY OF THE INVENTION

An optically readable structure on a subtrate of an information disc with a very small eccentricity, smaller than the required 20 microns, is provided. The disc includes a disc hub provided with central disc-centring means, intended for centring the finished information disc on the drive spindle of a drive apparatus, mounted in the centre of the substrate and is permanently attached to the substrate.

The small eccentricity of the structure on the substrate obtained is due to the fact that the accuracy with which the mould structure is centred relative to the base of a mold is transferred to the substrate through the cooperation between the disc-centring means and base-centring means on a base of the mold. During use the finished information disc cooperates with the drive spindle of a drive apparatus using the same disc-centring means that were employed during manufacture for centring the information disc on the mould. Thus, the high accuracy of the centring on the mould is not lost at a later stage, which would happen if the disc-centring means would have been mounted at a later stage. A substantial advantage of the invention is that the method can be carried out with a short cycle time. This is because the method does not require any measurements and/or alignments. The optical information disc is manufactured by means of expensive equipment in clean rooms so that a very short cycle time is very desirable in order to reduce the cost price of the product.

Usually the mould structure is formed on a carrier obtained by an electroplating method and is secured to the base as a thin metal disc, generally referred to a "shell". A method of manufacturing a mould suitable for the invention will be described hereinafter.

Although the invention is primarily intended for transparent glass or plastic substrates and with a reproduction layer made of a transparent radiation-curable moulding resin, the invention may in principle also be applied to non-transparent substrates and reproduction layers of a different type. This layer may be a plastic foil which adapts itself to the mould structure under the influence of heat. It is also conceivable that a reproduction layer is formed by softening the surface of the substrate itself.

The base-centring means comprise a central recess in the base of the mould and the disc-centring means may have a central through-hole in the disc hub. The hub is centred by means of an auxiliary-centring means which is inserted into the through-hole and makes contact both with the wall of the central recess in the base and with the wall of the through-hole in the hub. The base-centring means may thus have very simple shape and can be manufactured easily. Damaging of the base-centring means is practically impossible, because of these means do not project from the base. The auxiliary centring means have a simple shape and yet contribute to a high centring accuracy. Preferably, the construction is such that the auxiliary centring means cooperate with the two said walls without clearance.

The disc hub may be axially deformable to a limited extent and when the auxiliary centring means are inserted they first abut against the wall of the through-hole in the disc hub and, subsequently, after an axial displacement, also abut against the wall of the central recess in the base of the mould. Since the auxiliary centring means abut both against the wall of the through-hole in the hub and against the wall of the central recess in the base of the mould, this ensures that for auxiliary centring means cooperate with the two other centring means without any clearance. As a result of the axial deformability of the hub the cooperation with these two centring means is independent of any tolerances in the axial distance between the base-centring means and the disc-centring means of an intermediate product which is mounted on the mould. These variations can only give rise to variations in the axial deformation of the hub relative to the mould.

A slight axial deformation of the hub is a centring principle which is also suitable for centring a finished information disc on a drive apparatus. U.S. Pat. No. 4,224,648 describes such a centring principle for a magnetic information disc. Since an axial deformation of the hub may lead to small displacements in a radial direction of the substrate relative to the mould a further embodiment of the invention is important, which is characterized in that axial deformation of the disc hub on the mould has a predetermined value equal to the axial deformation to which the hub is subjected when the finished information is mounted on the spindle of a drive apparatus. Centering errors as a result of axial deformation of the hub when the finished information disc is mounted on a drive spindle have at most a very small influence on the eccentricity. This is because allowance is made for such errors when the substrate is provided with the structure.

Satisfactory results have been obtained with a method which is characterized in that the auxiliary centring means comprise a centring face which is situated on a spherical surface and which engages with walls of the disc hub and the mould along circular lines of contact. This embodiment is particularly suitable in combination with a further embodiment, in which the wall of the central recess in the base of the mould is situated on a conical surface and the wall of the through-hole in the disc hub is situated on a spherical surface of a diameter substantially equal to that on which the centring face of the auxiliary centring means is situated.

In order to enable the auxiliary centring means to be handled more conveniently, they may comprise a ball mounted on a stem. Balls having radii with very small tolerances are commercially available. A similar ball may be used on the spindle of the drive apparatus for which the information disc is intended. For handling the intermediate product—the assembly comprising the substrate to which the disc hub is secured—in the various stages of manufacturing the information disc it is found to be advantageous if the information disc hub is formed with a plurality of recesses or openings at a distance from the centre for receiving portions of an auxiliary tool for manipulating the intermediate product. In this way it is possible to preclude damage to the disc-centring means during manufacture, which might subsequently lead to an undesired increase in the eccentricity of the structure relative to the axis of rotation of the information disc.

The disc hub may be made of one piece of a resilient metal sheet material which is locally formed with apertures to increase its axial flexibility. In this embodiment the disc hub may be a single part which is suitable for being connected to the substrate and in which the disc-centring means are formed directly by means of suitable metal-deformation methods. Moreover, this embodiment is particularly suitable for use in an information disc of the type in which a cover disc, which may be constituted by a second substrate, is mounted coaxially with and at a distance from the substrate by spacer means near the centre of the information disc. Such an information disc enables the use of a further embodiment in which the disc hub forms part of the spacer means.

In known information discs comprising spacer means, as in U.S. Pat. No. 4,074,282, the spacer means comprise annular spacers made of a metal, because metal is not permeable to oxygen or water vapour from the surrounding atmosphere. This is important because oxygen and water vapor may affect the properties of the metal recording layer. With an information disc in accordance with the invention it is not necessary to use additional annular spacers near the centre. Moreover, each disc hub has already been secured to a substrate in an earlier stage, so that only the other substrate has to be secured, as by another disc hub. If two substrates are secured to each other, the presence of said recesses or openings for the insertion of an auxiliary tool is advantageous for centring the two substrates relative to each other, specifically in order to preclude an unbalance. When the information disc is mounted on a drive apparatus each substrate is centred on the drive spindle by means of its own disc hub, so that an information disc having two sides on which recordings can be made is centred relative to the drive spindle of the drive apparatus in the same way as two separate information discs each having separate centring means.

DETAILED DESCRIPTION OF THE PREFERRED EMBODIMENTS

Figure 1:
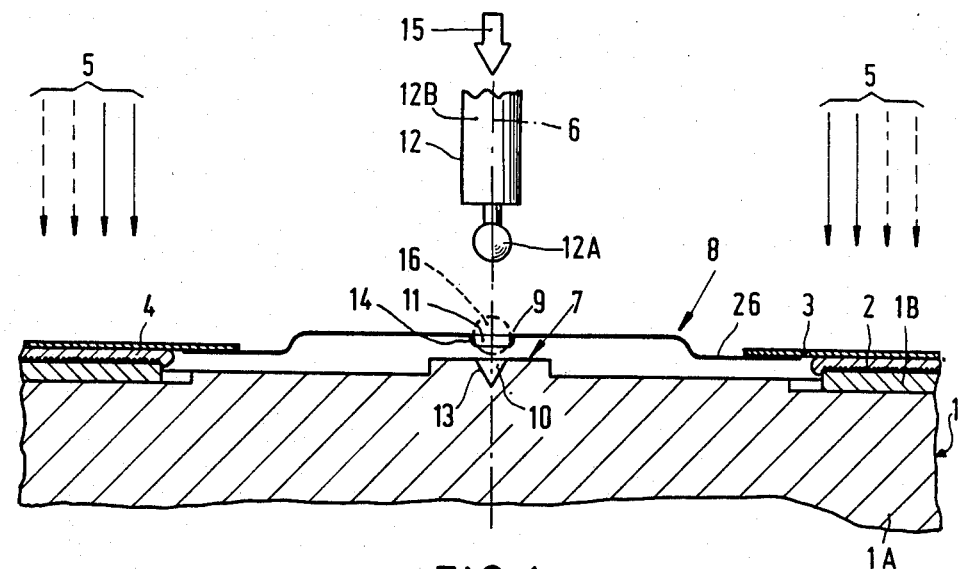
FIG. 1 is a sectional view across the centre of a part of a mould with a superimposed substrate and a view of a part of an auxiliary tool.

FIG. 1 shows a mould 1 having a base 1A to which a structure carrier 1B is fixed. The upper side of this carrier has a mould structure 2, which is the negative of a structure to be formed on the substrate 3. The substrate is transparent and is made of, for example, glass or a polycarbonate. Between the mould structure 2 and the substrate 3 a reproduction layer 4 is applied in a liquid condition. In the present embodiment this layer is a layer of a radiation-curable substance applied by means of a method as described in U.S. Pat. No. 4,312,823. In accordance with this known method a ring of a liquid moulding resin is applied to the mould 1 near the centre of the mould structure 2 and a substrate 3 which has been preformed to give it a vaulted spherosymmetrical shape is first placed on the resin near the centre, after which by gradually eliminating the vaulted shape the ring of resin is spread uniformly in a radial direction to form a thin layer. The resin is cured by exposing the reproduction layer 4 to radiation 5 which traverses the transparent substrate 3 and causes polymerisation of the resin, so that the reproduction layer changes from the deformable phase to a solid phase. The reproduction layer 4 then adheres to the substrate, 3 so that after curing the substrate with the reproduction layer can be taken from the mould whilst maintaining the structure reproduced in the reproduction layer.

In FIG. 1 the centre of the mould 1 is marked by the central axis 6. The axis of rotation of the finished information disc, of which eventually the substrate 3 will form a part, coincides as far as possible with the central axis 6. Prior to this the mould structure 2 is centred very accurately relative to the central axis 6. As will be described hereinafter, the mould structure 2 is formed on the base 1A in a position which is centred relative to and with the aid of the base-centring means 7. Therefore, it is essential to centre the substrate 3 very accurately relative to the mould 1. For this purpose the base 1A of the mould carries 1 has base-centring means in the form of pedestal 7 in its centre. A sheet metal disc hub 8 is secured to the centre of the substrate 3 by any suitable means, for example by means of a suitable adhesive layer, such as an epoxy resin. Once the hub 8 has been mounted it remains connected to the substrate, 3 and forms part of the information disc to be manufactured. The disc hub 8 comprises disc-centring means 9 which are intended for centring the finished information disc on the drive spindle of a drive apparatus. In this way an intermediate product is obtained, which comprises the substrate 3 and the disc hub 8. A stock of such intermediate products (3,8) can be manufactured in advance by separate manufacturing means and in a later stage they may be provided with the desired structure. An essential aspect of the invention is that the intermediate product is centred on the mould by the cooperation between the base-centring means 7 and the disc-centring means 9, thus providing the required high centring accuracy of the mould structure 2 relative to the axis of rotation of the information disc to be manufactured. After the substrate 3 has thus been centred on the mould the reproduction layer 4 is cured on this centred position and thereby also adheres to the substrate.

In the present embodiment the base-centring means 7 comprises a central recess 10 having conical wall 13 in the base 1A. The disc-centring means 9 comprise a central through-hole 11 having a frusto-spherical wall 14 in the disc hub 8. The intermediate product (3,8) is centred on the mould 1 with the aid of separate auxiliary centring means 12 which is inserted through the hole 11 to contact both the wall 13 of the central recess 10 and the wall 14 of the through-hole 11. FIG. 1 shows the auxiliary centring means 12 in a position at some distance above the disc hub 8.

The end of the auxiliary centring means 12 comprise a spherical portion 12A of accurately defined diameter on a stem 12B. The centring face of the auxiliary centring means is situated on the surface of the ball 12A and engages against walls 13 and 14 of the disc hub and the mould respectively along circular lines of contact. In the present embodiment the wall 13 is situated on a conical surface whose axis coincides with the central axis 6. The wall 14 of the through-hole 11 in the disc hub 8 is situated on the surface of a sphere 16 represented by a broken line. The diameter of this sphere is substantially equal to that of the sphere 12A on which the centring face of the auxiliary means 12 is situated.

Centring of the intermediate product (3,8) comprising the substrate 3 and the disc hub 8 on the mould 1 is effected as follows. After a ring of moulding resin has been deposited on the mould in the manner described in the foregoing and the substrate 3 has been lowered onto the mould, 2 thereby forming the reproduction layer, 4 the intermediate product and the mould are in the pre-centred position relative to each other as shown in FIG. 1. The auxiliary centring means 12 is brought into contact with the wall 14 of the central hole 11 in the hub 8, which may be effected manually. By exerting some axial force the disc hub 8 is axially distorted to a limited extent. The ball 12A projects slightly from the hub 8 and the projecting portion engages against the wall 13 of the central recess 10 in the base 1A of the mould. In this situation the ball 12A is in contact with the wall 14 of the hub 8 and with the wall 13 of the base 1A along circular lines of contact, without the hub 8 and the base 1A locally being in contact with each other. The ball 12A is in contact with both the mould and the hub 8 without any clearance. This guarantees an excellent centring. It is very important that in the present method, the centring of the intermediate product (3,8) and the mould 1 relative to each other does not depend on the clearance between the various parts. An advantage is that the direction in which the auxiliary centring means 12 are moved from the position shown in FIG. 1 need not be perfectly axial, because this direction is in principle irrelevant as a result of the spherical shape of the ball 12. If the auxiliary centring means are applied by means of a mechanically actuated mechanism, possible lost motion in the mechanism used will not affect the centring of the intermediate product on the mould. The excellent centring cannot be disturbed after this, because the hub 8 is fixedly connected to the substrate 3 and can no longer be moved relative to this substrate.

When the disc hub 8 is axially deformed for centring the intermediate product (3,8) on the mould 1 a minimal axial radial displacement of the substrate relative to the mould 1 is possible as a result of a radial component of the deformation of the disc hub. In order to minimize the effect of this displacement on the centring of the information disc on the drive spindle of a drive apparatus, steps are taken to ensure that the axial deformation of the hub on the mould has a predetermined value equal to the values of the axial deformation to which the hub is subjected when the finished information disc is mounted on the spindle of a drive apparatus. Thus, the above effect is reproduced every time that the information disc is placed on a drive spindle. Therefore, no undesired eccentricity results, because allowance is made for this effect when the substrate is provided with the structure.

The mould in FIG. 1 is manufactured as follows. A negative is made from a "mother disc", provided with a structure which eventually should be formed on the information disc to be manufactured, using known, for example electroforming, techniques. The negative may be connected to a metal backing plate, which in the present Application is referred to as a "structure carrier" 1B. This carrier is detachably connected to an auxiliary substrate, for example identical to the substrate 3. This may be effected by applying a radiation-curable reproducing layer between the structure carrier 1B and the auxiliary substrate in the manner described. The auxiliary substrate need only be centred enough relative to the structure carrier. The adhesion of the reproduction layer 4 is adequate, temporarily connecting auxiliary substrate and the structure carrier to each other.

An auxiliary tool includes tool-centring means which are identical to the base-centring means 7 of the base 1A and which thus also includes a conical recess 10. By suitable means, for example optical measuring equipment, the assembly comprising the auxiliary substrate and the separate structure carrier is centred relative to the tool centring means. For this purpose it should be possible to detect the mould structure, which in the present embodiment is simple when a transparent auxiliary substrate and a transparent reproduction layer are used.

After the mould structure 2 has thus been centred accurately relative to the tool-centring means a disc hub 8 is placed on the auxiliary subtrate and is centred relative to the tool-centring means using auxiliary centring means identical to the auxiliary centring means 12. In the centred relationship thus obtained, the disc hub 8 is fixedly connected to the auxiliary substrate, for example by means of a suitable type of cold-curing adhesive.

The assembly comprising the interconnected structure carrier, the auxiliary substrate and the disc hub is now placed on and centred relative to the base of the mould in accordance with the method described with reference to FIG. 1. Subsequently, the structure carrier 1B is affixed to the base 1A, for example by vacuum suction, and the substrate 3 carrying the reproduction layer 4 is detached from the structure carrier 1B.

By means of the above-described methods of manufacturing the mould and forming the structure on the substrate of the information disc excellent results have been achieved, the eccentricity of the structure of the finished information disc thus manufactured being less than 5 microns. Accurate measuring equipment is necessary only in the manufacture of the mould. An important variant of the method of manufacturing the mould is the method employing a radiation-curable resin for temporarily connecting the auxiliary substrate to the structure carrier. Thus, the temporary connection is obtained without the auxiliary substrate and the separate structure carrier being subjected to any stresses. This precludes the occurrence of deformations which may affect the attainable accuracy.

Figure 2:
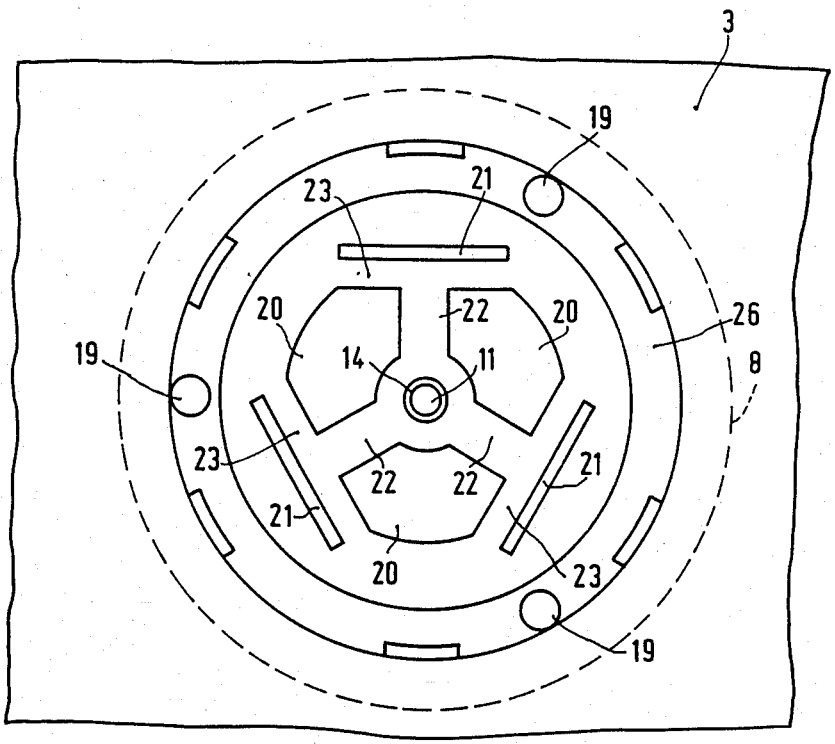
FIG. 2 is a full-scale plane view of a disc hub mounted on a substrate.
Figure 3:
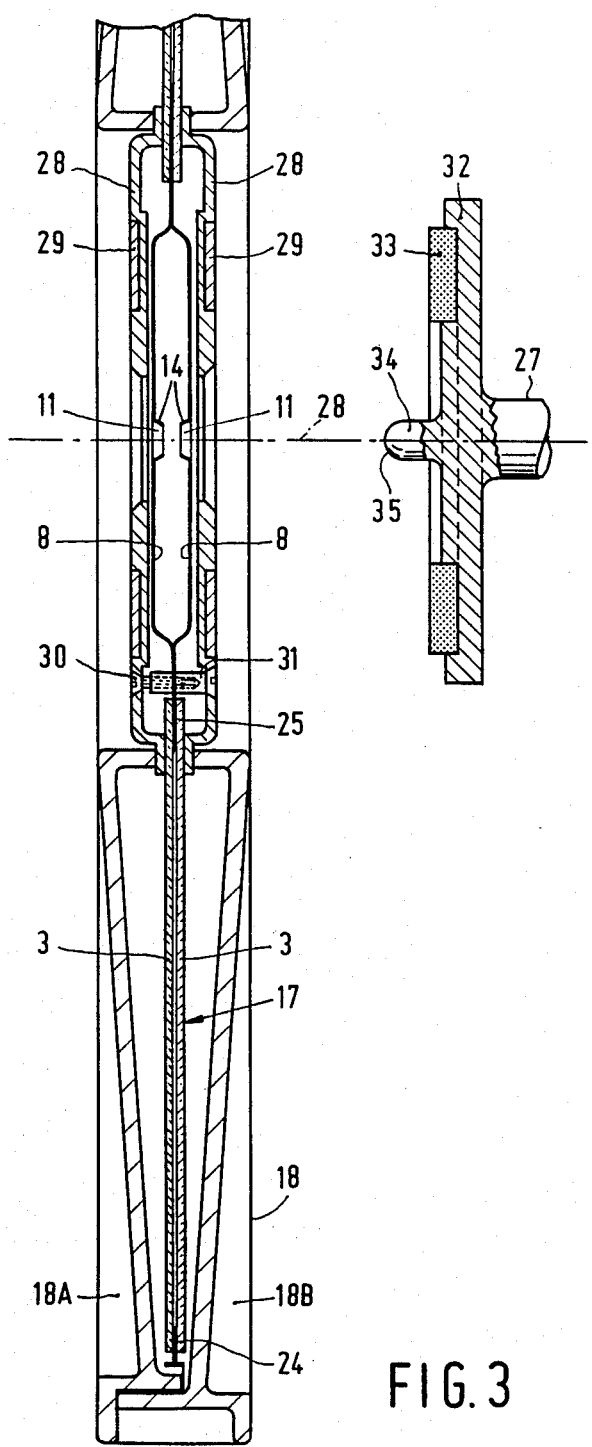
FIG. 3 is a substantially full-scale sectional view of a part of an information disc accommodated in an associated enclosure and situated at some distance from a spindle of a drive apparatus.

FIG. 3 shows an information disc 17 comprising two substrates 3 each having a separate disc hub 8. The information disc is accommdated in an enclosure 18 comprising two parts 18A and 18B. The design of the enclosure falls beyond the scope of the present invention and is therefore not described. It is to be noted merely that when placed in a drive apparatus the two parts 18A and 18B are axially moved relative to each other to provide room for the rotation of the information disc. The two disc hubs 8 are identical to each other and identical to the disc hub shown in FIGS. 1 and 2.

Referring to FIG. 2, the hub 8 is formed with three through-holes 19 at like distance from the centre which serve for inserting parts of an auxiliary tool employed for manipulating the intermediate product comprising the substrate 3 and the hub 8 which is secured thereto. In this way it is not necessary to use the central hole 11 of the hub for manipulating the intermediate product. This is important because the wall 14 of the central hole is liable to be damaged. Any damage to this wall, even the slightest damage, contributes to the eccentricity of the structure on the substrate relative to the axis of rotation of the finished information disc. The disc hub 8 is made of one piece of a resilient metal sheet material, which is locally provided with openings 20,21 to increase its axial flexibility. In this way the radial disc hub is provided with radial blade springs 22, whose radial ends are connected to tangential blade springs 23, thereby guaranteeing the desired axial flexibility.

The two substrates 3 of the information disc 17 shown in FIG. 3 are coaxially spaced from each other by first circumferential spacer means 24 and second spacer means 25 near the centre of the information disc. The outer spacer means 24 comprise a metal annular spacer of T-shaped cross-section which forms an annular guard ring around the information disc. The second spacer means 25 near the centre of the information disc comprise the interconnected annular outer portions 26 of the two hubs 8. Although the information disc 17 in FIG. 3 comprises two substrates, 3 it is important that the structure on each substate is centred relative to the axis of rotation 26 of the drive spindle 27 by means of an associated separate hub 8. Therefore, the two substrates need not be centred perfectly relative to each other. Moreover, this is partically impossible, at least very difficult, in practice.

In order to be driven the information disc 17 comprises a hub in its centre, which hub comprises two identical plastic shells 28 in which a soft-iron ring 29 is glued. The two shells are circumferentially supported by the two substrates 3 and are interconnected by three bolts 30 and nuts 31 inserted through holes 19 in the hubs. The drive spindle 27 comprises a flange 32, which carries a magnetic ring 33 and a central centring pin 34 having a spherical end portion 35. The radius of the frusto-spherical surface 14 of the drive spindle is exactly equal to the radius of the ball 12A of the auxiliary centring means in FIG. 1. The information disc 17 is mounted on the drive spindle 27 in such a way that the spherical end portion 35 of the centring pin 34 engages the central opening 11 in the hub. The iron ring 29 is drawn against the permanent magnet 33, so that the spherical end portion 35 of the centring pin abuts against the wall 14 of the central hole 11. As already stated, this gives rise to a small predetermined axial deformation of the hub.

Within the scope of the invention many variants are possible. The substrate 3 need not be transparent, the reproduction layer 4 need not be made of a radiation-curable resin, the disc hub 8 need not be made in one piece and need not be made of a metal or entirely of a metal, the base-centring means 7 and the disc-centring means 9 may comprise centring means other than the central recess 10 and the central hole 11 respectively, for example means which are pin-shaped, similar to the centring pin 34 of the drive spindle 27 shown in FIG. 3.

What is claimed is:

1. An optically readable information disc comprising:
   an annular substrate,
   a reproduction layer adhered to said substrate, said reproduction layer having an optically readable structure formed by a mold and facing away from said substrate,
   a disc hub permanently attached to the center of said substrate, said disc hub having disc centering means intended for centering said hub relative to said mold during manufacture and for centering the finished information disc on the drive spindle of a drive apparatus during use.

2. A disc as in claim 1 wherein said disc hub is axially deformable, said hub being axially deformable to the same extent during use as during adhering of said reproduction layer to said substrate during manufacture, whereby said reproduction layer suffers no eccentricity when read.

3. A disc as in claim 1 wherein said disc centering means comprises a through-hole situated on a frustospherical surface.

4. A disc as in claim 1 wherein said disc hub is provided with a plurality of openings a distance from the center for receiving portions of an auxiliary tool.

5. An information disc as in claim 1, further comprising a second annular substrate coaxial with said substrate, said second substrate being spaced from said substrate by spacer means comprising said disc hub.

6. A disc as in claim 5 further comprising a second disc hub attached to the center of said second substrate, said second disc hub being substantially identical to said first disc hub and coaxial therewith, said spacer means further comprising said second disc hub.

7. A disc as in claim 6 further comprising circumferential spacer means between said substrates about the circumference of said disc.

8. A disc as in claim 7 wherein said circumferential spacer means is an annular spacer of T-shaped cross-section which not only spaces said substrates but guards the circumference of the disc.

9. An optically readable information disc comprising a pair of annular substrates a pair of reproduction layers adhered to respective substrates, each reproduction layer having an optically readable structured formed by a mold and facing away from the respective substrate, a pair of disc hubs, each attached to the center of a respective substrate on the same side as the respective reproduction layer, said hubs being sandwiched together and serving to space said substrates.

10. A disc as in claim 9 further comprising circumferential spacer means between said substrates about the circumference of said disc.

11. A disc as in claim 10 wherein said circumferential spacer means is an annular spacer of T-shaped cross-section which not only spaces said substrates but guards the circumference of the disc.

12. A disc as in claim 9 wherein each hub is axially deformable to the same extend during use as during adhering of said reproduction layer to said substrate during manufacture, whereby said reproduction layer suffers no eccentricity when read.

13. A disc as in claim 12 wherein each hub, when axially deformed during use, does not interfere with the other hub.

14. An optically readable information disc comprising an axially, resiliently deformable hub having disc centering means for centering said disc on the spindle of a drive apparatus and an axis of rotation through said disc centering means an annular substrate permanently attached to said hub, said substrate suffering small displacements in the radial direction when said hub is axially deformed, a molded spiral servo track concentrically arranged with respect to said axis of rotation, said track likewise suffering small radial displacements when said hub is axially deformed, said track being molded with a minimum of eccentricity with respect to said axis of rotation while said hub is axially deformed to a predetermined extent, whereby said track has a minimum of eccentricity with respect to said axis of rotation when said hub is axially deformed to said predetermined extent, whereby said track will have excellently reproducible centering with respect to said spindle when said hub is axially deformed to said predetermined extent during use in said drive apparatus.

15. An optically readable information disc as in claim 14 further comprising a reproduction layer adhered to said substrate, said spiral servo track being molded in said reproduction layer while said hub is axially deformed to said predetermined extent.

* * * * *